US012578598B2

(12) United States Patent
Horikawa et al.

(10) Patent No.: US 12,578,598 B2
(45) Date of Patent: Mar. 17, 2026

(54) LIGHT CONTROL SHEETS AND METHODS OF PRODUCING LIGHT CONTROL SHEETS

(71) Applicant: TOPPAN HOLDINGS INC., Tokyo (JP)

(72) Inventors: Kimio Horikawa, Taito-ku (JP); Fumio Oonuma, Taito-ku (JP); Toshiji Yasuhara, Taito-ku (JP); Gen Nakamura, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/934,772

(22) Filed: Nov. 1, 2024

(65) Prior Publication Data

US 2025/0060623 A1     Feb. 20, 2025

Related U.S. Application Data

(63) Continuation of application No. PCT/JP2023/017141, filed on May 2, 2023.

(30) Foreign Application Priority Data

May 2, 2022     (JP) ................................. 2022-076048

(51) Int. Cl.
    *G02F 1/133*          (2006.01)
(52) U.S. Cl.
    CPC ........ *G02F 1/133* (2013.01); *G02F 2202/022* (2013.01)

(58) Field of Classification Search
    CPC .. G02F 1/133; G02F 1/1334; G02F 2202/022; G02F 1/133371; G02F 1/315
    See application file for complete search history.

(56) References Cited

U.S. PATENT DOCUMENTS

| | | | |
|---|---|---|---|
| 5,342,545 A | 8/1994 | Yamada et al. | |
| 5,519,519 A | 5/1996 | Nakajima et al. | |

(Continued)

FOREIGN PATENT DOCUMENTS

| | | |
|---|---|---|
| JP | H06-059246 A | 3/1994 |
| JP | 2002-182188 A | 6/2002 |

(Continued)

OTHER PUBLICATIONS

International Search Report issued Jul. 25, 2023 in PCT/JP2023/017141, filed May 2, 2023, with English translation, 5 pages.

(Continued)

*Primary Examiner* — Insa Sadio
(74) *Attorney, Agent, or Firm* — Oblon, McClelland, Maier & Neustadt, L.L.P.

(57)     ABSTRACT

A light control sheet is reversibly changeable between transparent and opaque in response to a change in alignment of a liquid crystal compound. The light control sheet includes a light control layer including a polymer resin layer in which voids are dispersed, and a liquid crystal composition containing the liquid crystal compound. The liquid crystal composition is filling the voids. In the light control layer, a percentage of a volume of the liquid crystal composition relative to a total volume of the polymer resin layer and the liquid crystal composition is 40% or greater and 60% or less. Avoid diameter of the voids is 2 μm or less.

6 Claims, 4 Drawing Sheets

(56) References Cited

U.S. PATENT DOCUMENTS

2003/0016905 A1* 1/2003 Kondoh .................. G02F 1/315
349/196
2015/0349028 A1 12/2015 Lee et al.
2017/0152702 A1 6/2017 Chang et al.

FOREIGN PATENT DOCUMENTS

JP          2002-268050 A      9/2002
JP          2003-329994 A     11/2003
JP          2007-72131 A       3/2007
JP            3203546 U        4/2016
JP            6414312 B       10/2018
WO      WO 2021/045083 A1     3/2021

OTHER PUBLICATIONS

Third Party Observation issued on Aug. 20, 2025 in European Patent
Application No. 23799509.7, 17 pages.
Extended European Search Report issued Jun. 30, 2025 in European
Patent Application No. 23799509.7, 9 pages.

* cited by examiner

LIGHT CONTROL SHEETS AND METHODS OF PRODUCING LIGHT CONTROL SHEETS

CROSS-REFERENCE TO RELATED APPLICATIONS

The present application is a continuation of and claims the benefit of priority to International Application No. PCT/JP2023/017141, filed May 2, 2023, which is based upon and claims the benefit of priority to Japanese Application No. 2022-076048, filed May 2, 2022. The entire contents of these applications are incorporated herein by reference.

BACKGROUND OF THE INVENTION

Field of the Invention

The present invention relates to light control sheets and methods of producing light control sheets.

Description of Background Art

JP 6414312 B describes a light control sheet including a light control layer and a pair of transparent electrode layers sandwiching the light control layer. The entire contents of this publication are incorporated herein by reference.

SUMMARY OF THE INVENTION

According to one aspect of the present invention, a light control sheet includes a light control layer including a polymer resin layer and a liquid crystal composition such that the polymer resin layer has voids and the liquid crystal composition is filling the voids. The light control layer reversibly changes between transparent and opaque in response to a change in alignment of a liquid crystal compound in the liquid crystal composition and formed such that a volume of the liquid crystal composition relative to a total volume of the polymer resin layer and the liquid crystal composition is in a range of 40% to 60% and a void diameter of the voids is 2 μm or less.

According to another aspect of the present invention, a method of producing a light control sheet includes forming a light control layer including a polymer resin layer and a liquid crystal composition including a liquid crystal compound such that the polymer resin layer has voids dispersed by phase separation of a layer including the liquid crystal compound and a photopolymerizable compound and that the liquid crystal composition is filling the voids. The forming the light control layer includes the phase separation that causes a volume of the liquid crystal composition relative to a total volume of the polymer resin layer and the liquid crystal composition to be in a range of 40% to 60% in the light control layer and that a void diameter of the voids to be 2 μm or less in the light control layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
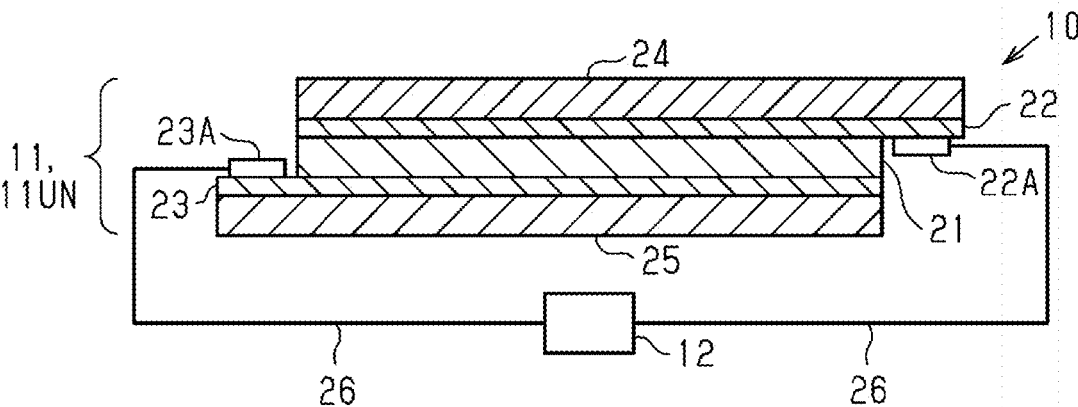
FIG. 1 is a cross-sectional view illustrating a first example structure of a light control sheet.

Embodiments will now be described with reference to the accompanying drawings, wherein like reference numerals designate corresponding or identical elements throughout the various drawings.

With reference to FIGS. 1 to 8, a light control sheet and a method of producing a light control sheet according to embodiments of the present invention will be described.

Structure

As shown in FIG. 1, a light control device 10 of the present embodiment includes a light control sheet 11 and a driving unit 12. The light control sheet 11 is reversibly changeable between transparent and opaque in response to a change in alignment of a liquid crystal compound. In the present embodiment, the light control sheet 11 is of a normal type. The normal type light control sheet 11 becomes transparent when a voltage is applied to the light control sheet 11. In contrast, the light control sheet 11 becomes opaque when no voltage is applied to the light control sheet 11.

The light control sheet 11 may be applied to windows of moving objects such as vehicles and aircraft. Further, the light control sheet 11 may be applied to windows of various buildings such as houses, stations and airports, partitions installed in offices, display windows provided in stores, or screens for projecting images. The light control sheet 11 may be attached to such objects using, for example, an adhesive layer. The shape of the light control sheet 11 may be flat or curved. The light control sheet 11 may have flexibility sufficient to conform to the shape of the applied object.

The light control sheet 11 includes a light control layer 21. The light control layer 21 includes a polymer resin layer and a liquid crystal composition. The polymer resin layer contains voids dispersed therein. The liquid crystal composition contains a liquid crystal compound, and fills the voids. The light control layer 21 satisfies the following Conditions 1 and 2.

Condition 1. In the light control layer 21, a percentage of a volume of the liquid crystal composition relative to a total volume of the polymer resin layer and the liquid crystal composition is 40% or greater and 60% or less.

Condition 2. Avoid diameter of the voids is 2 μm or less.

The percentage of the volume of the liquid crystal composition relative to the total volume of the polymer resin layer and the liquid crystal composition is referred to as a volume occupancy of the liquid crystal composition. Further, the percentage of the volume of the polymer resin layer relative to the total volume of the polymer resin layer and the liquid crystal composition is referred to as a volume occupancy of the polymer resin layer.

When the light control layer 21 has a thickness DLC and a void diameter DD, the light control layer 21 preferably satisfies at least one of the following Conditions 3 and 4. That is, the light control layer 21 may satisfy only Condition 3, only Condition 4, or both Conditions 3 and 4.

Condition 3. Thickness DLC≤Void diameter DD+20 μm

Condition 4. 17 μm≤Thickness DLC

The voids dispersed in the polymer resin may include only voids that are isolated from each other in the polymer resin layer, that is, voids that are not connected to other voids, or may contain only voids that are connected to other voids. Alternatively, the voids may include both voids that are isolated from each other in the polymer resin layer and voids that are connected to other voids.

The void diameter is an index of the size of the voids. The void diameter is identified for the voids contained in the cross-section perpendicular to the plane in which the light control layer 21 extends. When the voids have a circular shape, the diameter of the void is the void diameter. When the voids have an elliptical shape, the major axis length of the void is the void diameter. When the voids have an irregular shape, the diameter of the circumscribed circle of the void is the void diameter.

When calculating the void diameter in the light control layer 21, first, the light control layer is cut perpendicular to the plane in which the light control layer 21 extends to thereby prepare a cross-section for measurement. Then, the cross-section for measurement is observed with a scanning electron microscope (SEM) to measure void diameters of the voids contained in the cross-section for measurement. Then, the sum of the void diameters of the voids is divided by the number of voids to average the void diameters. The average value of the void diameters is the void diameter in the light control layer 21. The void diameter may be 0.5 μm or greater and 3.0 μm or less, and the upper limit of the void diameter is preferably 2.0 μm or less.

The liquid crystal compound contained in the liquid crystal composition is a positive type liquid crystal compound having positive dielectric anisotropy. The liquid crystal compound preferably has a refractive index anisotropy Δn of 0.15 or greater. The refractive index anisotropy Δn is a value obtained by subtracting an ordinary refractive index no of the liquid crystal compound from an extraordinary refractive index ne. The ordinary refractive index no of the liquid crystal compound may be 1.51 or greater and 1.71 or less.

Examples of the liquid crystal compound include those selected from Schiff base compounds, azo compounds, azoxy compounds, biphenyl compounds, terphenyl compounds, benzoic acid ester compounds, tolan compounds, pyrimidine compounds, cyclohexanecarboxylic acid ester compounds, cyclohexane compounds, phenylcyclohexane compounds and dioxane compounds. The liquid crystal composition may contain a first liquid crystal compound and a second liquid crystal compound, which is of a type different from the first liquid crystal compound.

The polymer resin layer is a cured photopolymerizable compound. When the polymer resin layer has a refractive index np, the absolute value of the difference between the ordinary refractive index no of the liquid crystal compound and the refractive index np of the polymer resin layer is preferably 0.08 or less. The refractive index np of the polymer resin layer may be, for example, of the order of 1.51. The photopolymerizable compound may be a UV-curable compound or an electron beam-curable compound. The photopolymerizable compound is compatible with the liquid crystal composition. In order to improve the dimensional controllability of the voids, the photopolymerizable compound is preferably a UV-curable compound. An example of the UV-curable compound contains polymerizable unsaturated bonds at the ends of the molecular structure. Alternatively, the UV-curable compound contains polymerizable unsaturated bonds at sites other than the ends of the molecular structure. The photopolymerizable compound may be a single polymerizable compound or a combination of two or more polymerizable compounds.

The UV-curable compound may be, for example, at least one selected from acrylate compounds, methacrylate compounds, styrene compounds, thiol compounds, and oligomers of these compounds.

The acrylate compounds include monoacrylate compounds, diacrylate compounds, triacrylate compounds and tetraacrylate compounds. Examples of the acrylate compounds include butyl ethyl acrylate, ethyl hexyl acrylate and cyclohexyl acrylate. Examples of the methacrylate compounds include dimethacrylate compounds, trimethacrylate compounds and tetramethacrylate compounds. Examples of the methacrylate compounds include N,N-dimethylaminoethyl methacrylate, phenoxyethyl methacrylate, methoxyethyl methacrylate and tetrahydrofurfuryl methacrylate. Examples of the thiol compounds include 1,3-propanedithiol and 1,6-hexanedithiol. Examples of the styrene compounds include styrene and methyl styrene.

The lower limit of the volume occupancy of the polymer resin layer may be 40%. The upper limit of the volume occupancy of the polymer resin layer may be 60%. The upper and lower limits of the percentage of the polymer resin layer are within the range in which the liquid crystal compound is phase-separated from the cured photopolymerizable compound during the curing process of the photopolymerizable compound. From the perspective of improving the mechanical strength of the polymer resin layer, the lower limit of the volume occupancy of the polymer resin layer is preferably high. From the perspective of lowering the drive voltage of the liquid crystal compound, the upper limit of the volume occupancy of the polymer resin layer is preferably low.

The liquid crystal composition may contain a dichroic dye. The dichroic dye has an elongated shape. The visible light absorbance in the major axis direction of the molecules of the dichroic dye is greater than the visible light absorbance in the minor axis direction of the molecules. When the major axis direction of the dichroic dye is parallel or substantially parallel to the light incident direction, the dichroic dye becomes substantially transparent. On the other hand, when the major axis direction of the dichroic dye is perpendicular or substantially perpendicular to the light incident direction, the dichroic dye exhibits a predetermined color.

Therefore, the dichroic dye becomes transparent when the major axis direction is oriented parallel or substantially parallel to the direction normal to the plane in which the light control layer 21 extends. On the other hand, the dichroic dye exhibits a predetermined color when the major axis direction is oriented perpendicular or substantially perpendicular to the direction normal to the plane in which the light control layer 21 extends. It is preferred that the color exhibited by the dichroic dye is black or a color close to black. The dichroic dye is driven as a guest-host type with the liquid crystal compound as a host so that the dichroic dye exhibits a color.

The dichroic dye DP may be at least one selected from polyiodides, azo compounds, anthraquinone compounds, naphthoquinone compounds, azomethine compounds, tetrazine compounds, quinophthalone compounds, merocyanine compounds, perylene compounds and dioxazine compounds. The dichroic dye may be a single dye or a combination of two or more dyes. From the viewpoint of enhancing light resistance of the dichroic dye and increasing the dichroic ratio, the dichroic dye is preferably at least one selected from azo compounds and anthraquinone compounds. More preferably, the dichroic dye is an azo compound. The percentage of the mass of the dichroic dye relative to the mass of the light control layer 21 may be 0.5 mass % or greater and 5 mass % or less.

The liquid crystal composition may contain, in addition to the liquid crystal compound and the dichroic dye describe above, a photopolymerizable composition for forming the polymer resin layer, for example.

The light control sheet 11 further includes a first transparent electrode layer 22, a second transparent electrode layer 23, a first transparent substrate 24 and a second transparent substrate 25. The first transparent electrode layer 22 and the second transparent electrode layer 23 sandwich the light control layer 21 in the thickness direction of the light control sheet 11. The first transparent substrate 24 supports the first transparent electrode layer 22. The second transparent substrate 25 supports the second transparent electrode layer 23.

The light control sheet 11 includes a first electrode 22A attached to a portion of the first transparent electrode layer 22 and a second electrode 23A attached to a portion of the second transparent electrode layer 23. The light control sheet 11 further includes a wiring 26 connected to the first electrode 22A and a wiring 26 connected to the second electrode 23A. The first electrode 22A and the second electrode 23A are connected to the driving unit 12 via the wiring 26.

The first and second transparent electrode layers 22 and 23 have optical transparency to visible light. The light transparency of the first transparent electrode layer 22 allows objects to be visually recognized through the light control sheet 11. The light transparency of the second transparent electrode layer 23, as with the light transparency of the first transparent electrode layer 22, allows objects to be visually recognized through the light control sheet 11. The thickness of each of the transparent electrode layers 22 and 23 may be, for example, 0.005 μm or greater and 0.1 μm or less. This ensures appropriate driving of the light control sheet 11 and prevents occurrence of cracking in the light control sheet 11 when the light control sheet 11 bends. The material for forming the transparent electrode layers 22 and 23 may be one selected from, for example, indium tin oxide, fluorine-doped tin oxide, tin oxide, zinc oxide, carbon nanotubes and poly(3,4-ethylenedioxythiophene).

The material for forming the transparent substrates 24 and 25 may be a synthetic resin or an inorganic compound. The synthetic resin may be, for example, polyester, polyacrylate, polycarbonate or polyolefin. Examples of the polyester include polyethylene terephthalate and polyethylene naphthalate. Examples of the polyacrylate include polymethylmethacrylate. The inorganic compound may be, for example, silicon dioxide, silicon oxynitride or silicon nitride. The thickness of each of the transparent substrates 24 and 25 may be, for example, 16 μm or greater and 250 μm or less. The thickness of each of the transparent substrates 24 and 25 of 16 μm or greater makes it easy to process and install the light control sheet 11. The thickness of each of the transparent substrates 24 and 25 of 250 μm or less enables roll-to-roll production of the light control sheet 11.

The electrodes 22A and 23A may be, for example, flexible printed circuits (FPC). The FPC includes a support layer, a conductor portion and a protective layer. The conductor portion is sandwiched between the support layer and the protective layer. The support layer and the protective layer are made of an insulating synthetic resin. The support layer and the protective layer may be made of, for example, polyimide. The conductor portion may be made of, for example, a metal thin film. The material for forming the metal thin film may be, for example, copper. The electrodes 22A and 23A are not limited to FPC, and may be, for example, a metal tape.

The electrodes 22A and 23A are attached to the transparent electrode layers 22 and 23, respectively, via a conductive adhesive layer (not shown). In portions of the electrodes 22A and 23A that are connected to the conductive adhesive layer, the conductor portion is exposed from the protective layer or the support layer. The conductive adhesive layer may be formed of, for example, an anisotropic conductive film (ACF), an anisotropic conductive paste (ACP), an isotropic conductive film (ICF) or an isotropic conductive paste (ICP). From the viewpoint of ease of handling of the light control device 10 during production process, the conductive adhesive layer is preferably an anisotropic conductive film.

Each wiring 26 may be formed of, for example, a metal wire and an insulating layer covering the metal wire. The wire may be formed of, for example, copper.

The driving unit 12 applies an AC voltage between the first transparent electrode layer 22 and the second transparent electrode layer 23. Preferably, the driving unit 12 applies an AC voltage with a rectangular waveform between a pair of transparent electrode layers 22 and 23. Further, the driving unit 12 may apply an AC voltage having a waveform other than a rectangular waveform between a pair of transparent electrode layers 22 and 23. For example, the driving unit 12 may apply an AC voltage with a sinusoidal waveform between a pair of transparent electrode layers 22 and 23.

In the light control layer 21, the alignment of the liquid crystal compound changes in response to a change in voltage generated between the two transparent electrode layers 22 and 23. A change in alignment of the liquid crystal compound changes the degree of scattering, absorption and transmission of visible light entering the light control layer 21. The normal type light control sheet 11 has a relatively low haze value when the light control sheet 11 is energized, that is, when a potential difference is applied between the first transparent electrode layer 22 and the second transparent electrode layer 23. The normal type light control sheet 11 has a relatively high haze value when the light control sheet 11 is not energized, that is, when a potential difference is not applied between the first transparent electrode layer 22 and the second transparent electrode layer 23. Accordingly, the normal type light control sheet 11 becomes transparent when the light control sheet 11 is energized, and becomes opaque when the light control sheet 11 is not energized.

The haze value of the light control sheet 11 is calculated by the method according to JIS K 7136:2000 "Plastics—Determination of Haze for Transparent Materials."

Figure 2:
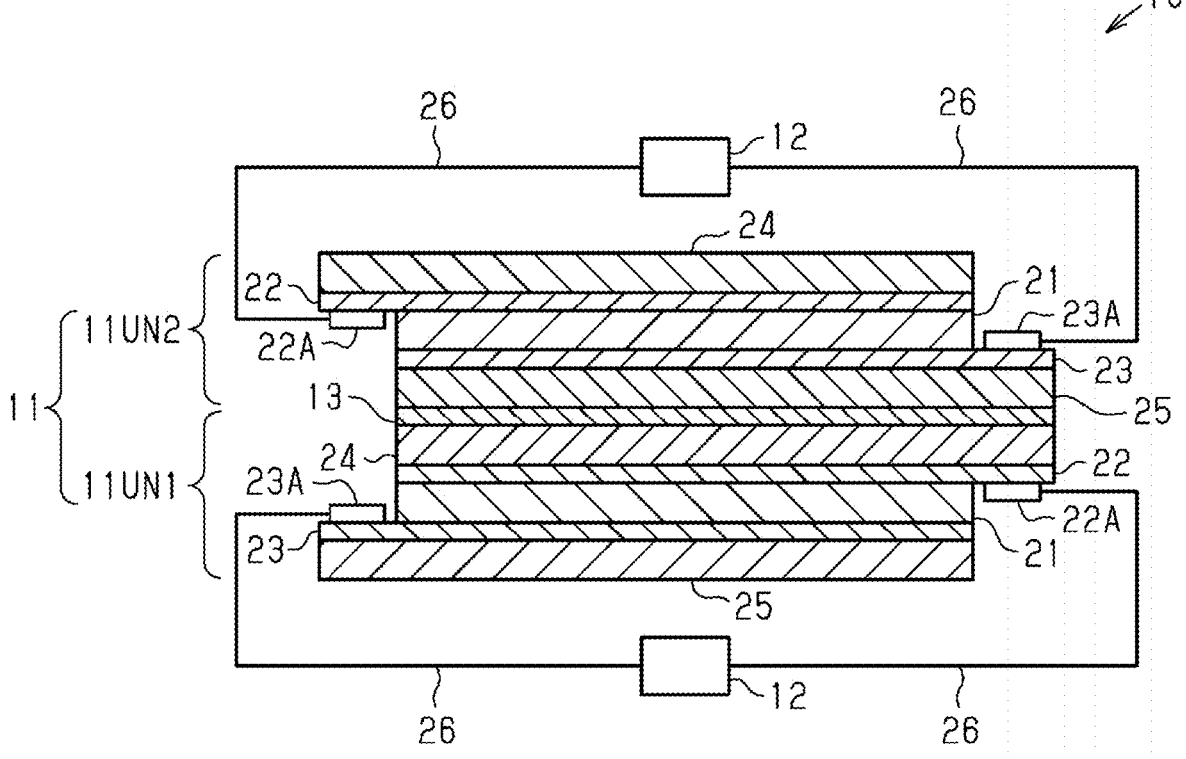
FIG. 2 is a cross-sectional view illustrating a second example structure of a light control sheet.

As shown in FIG. 2, the light control sheet 11 may include one light control layer 21 as a first light control layer and another light control layer 21 as a second light control layer. In the light control sheet 11, the second light control layer overlaps the first light control layer. The light control sheet 11 shown in FIG. 2 includes a first unit 11UN1 including the first light control layer and a second unit 11UN2 including the second light control layer. The respective units 11UN1 and 11UN2 have the same structure as the light control sheet 11 described above referring to FIG. 1. That is, each of the units 11UN1 and 11UN2 includes the light control layer 21, a pair of transparent electrode layers 22 and 23, and a pair of transparent substrates 24 and 25.

Both the first light control layer and the second light control layer satisfy the above Conditions 1 and 2. Condition 3 may be satisfied only in the first light control layer or only in the second light control layer or may be satisfied in both the first light control layer and the second light control layer. Further, Condition 4 may be satisfied only in the first light control layer or only in the second light control layer, or may be satisfied in both the first light control layer and the second light control layer.

In the light control sheet 11, the second unit 11UN2 overlaps the first unit 11UN1. An adhesive layer 13 is located between the second transparent substrate 25 of the first unit 11UN1 and the first transparent substrate 24 of the second unit 11UN2. The adhesive layer 13 is transparent and has adhesiveness and insulating properties. The adhesive layer 13 is made of a transparent adhesive. The adhesive may be, for example, an optical clear adhesive (OCA). The thickness of the adhesive layer 13 may be, for example, 10 μm or greater and 100 μm or less.

When the light control sheet 11 includes the first light control layer and the second light control layer, at least one of the first light control layer and the second light control layer may contain a dichroic dye. That is, only the first light control layer may contain a dichroic dye, only the second light control layer may contain a dichroic dye, or both the first light control layer and the second light control layer may contain a dichroic dye.

Production Method

The method of producing a light control sheet 11 includes forming a light control layer 21 including a polymer resin layer in which voids are dispersed by phase separation of a layer containing a liquid crystal compound and a photopolymerizable compound, and a liquid crystal composition containing the liquid crystal compound, the liquid crystal composition filling the voids. The forming a light control layer 21 includes performing the phase separation to cause a volume occupancy of the liquid crystal composition to be 40% or greater and 60% or less and a void diameter of the voids to be 2 μm or less.

When producing the light control sheet 11, first, a layer containing a liquid crystal compound and a photopolymerizable compound is formed. A layer containing a liquid crystal compound and a photopolymerizable compound may be formed by, for example, coating using a coating liquid. The coating liquid may contain a photopolymerization initiator and the like in addition to the liquid crystal compound and the photopolymerizable compound. Next, a pair of laminates of a transparent electrode layer and a transparent substrate are prepared. The coating liquid is applied to a first transparent electrode layer to form a coating film, and then a first laminate is overlapped with a second laminate with the coating film interposed between the pair of transparent electrode layers.

Then, the coating film is irradiated with light via at least one of the pair of the transparent substrates to thereby cure the coating film. That is, the coating film may be irradiated with light only via the first transparent substrate or only via the second transparent substrate of the pair of transparent substrates. Alternatively, the coating film may be irradiated with light via the first transparent substrate and via the second transparent substrate. Thus, the layer containing the liquid crystal compound and the photopolymerizable compound is irradiated with light to polymerize the photopolymerizable compound, whereby the liquid crystal compound is phase-separated from the polymer resin layer. Thus, the light control layer 21 is formed.

After the light control layer 21 is formed, a portion of each of the transparent electrode layers is exposed. Next, an electrode is attached to each of the exposed portions of the first and second transparent electrode layers. Then, after wiring is attached to each of the electrodes, the two wirings are connected to the driving unit 12. Thus, a light control device 10 can be obtained.

The light control layer 21 included in the light control sheet 11 satisfies both the above Conditions 1 and 2. That is, the voids with a void diameter of 2 μm or less and filled with the liquid crystal composition are dispersed in the polymer resin layer at a density, in other words, in an amount, such that the volume occupancy of the liquid crystal composition is 40% or greater and 60% or less. This facilitates occurrence of scattering at the interface between the polymer resin layer and the liquid crystal composition, suppressing transmission of parallel light through the light control layer 21, and as a result, the sense of translucency when the light control sheet 11 is in the opaque state is reduced.

The sense of translucency when the light control sheet 11 is in the opaque state varies depending on the degree of scattering of parallel light at the interface between the polymer resin layer and the liquid crystal composition. The higher the degree of scattering of parallel light, the more the light control sheet 11 appears turbid, and thus the lower the sense of translucency of the light control sheet 11.

The sense of translucency of the light control sheet 11 can be evaluated by the parallel light transmittance and can also be evaluated by the clarity. The parallel light transmittance is a value obtained by subtracting the diffuse transmittance $\tau_d$ from the total light transmittance $\tau_t$ calculated in accordance with JIS K 7136:2000 "Plastics—Determination of Haze." The diffuse transmittance $\tau_d$ is a transmittance of transmitted light deflected from the incident light by 2.5° or more due to forward scattering relative to the entire transmitted light that has passed through a specimen. On the other hand, the clarity is calculated from the following formula (1), where $L_C$ is the intensity of the straight light propagating straight along the optical axis of the parallel light that has entered the light control layer 21, and $L_R$ is the intensity of the narrow-angle scattered light having an angle within ±2.5° relative to the optical axis of the parallel light.

$$100 \times (L_C - L_R)/(L_C + L_R) \qquad \text{formula (1)}$$

The parallel light transmittance, as an index of the sense of translucency of the light control sheet 11, is an insensitive parameter that does not easily match human visual perception. On the other hand, the clarity, as an index of the sense of translucency of the light control sheet 11, is a sensitive parameter that easily matches human visual perception. However, for a specimen having high light absorbance, the clarity is a parameter that is also sensitive to the difference between the degree of absorption of parallel light and the degree of absorption of diffuse light.

Therefore, in the normal type light control sheet 11 containing no dichroic dye and having a structure that suppresses light absorption, it is preferred to identify the structure of the light control layer 21 having suitable scattering properties. In other words, according to the normal type light control sheet 11 containing no dichroic dye, the degree of scattering of parallel light at the interface between the pure polymer resin layer and the liquid crystal composition can be identified by a sensitive parameter.

In addition, even if a dichroic dye is added to the structure of the polymer resin layer and the liquid crystal composition identified in the light control layer 21 containing no dichroic dye, the sense of translucency of the light control sheet 11 is further reduced since parallel light, which may affect the sense of translucency, is simply absorbed by the dichroic dye.

Furthermore, when Condition 3 is satisfied, the haze value when the light control sheet 11 is in the opaque state can be increased, and the haze value when the light control sheet 11 is in the transparent state can be decreased. This can reduce the sense of translucency in the opaque state while ensuring sufficient transparency in the transparent state. Furthermore, when Condition 4 is satisfied, an increase in the clarity value when the light control sheet 11 is in the opaque state can be suppressed.

Moreover, in the light control sheet 11 including the first light control layer and the second light control layer, light that has entered the light control sheet 11 is more scattered in the light control sheet 11 when the light control sheet 11 is in the opaque state, compared to the light control sheet 11 including a single light control layer 21. Therefore, the sense of translucency when the light control sheet 11 is in the opaque state can be further reduced.

Test Examples

With reference to FIGS. 3 to 8 and Tables 1 to 3, test examples will now be described.
Volume Occupancy of Liquid Crystal Composition and Void Diameter Materials used in Test Examples 1 to 6 below are as follows.

First transparent electrode layer: Indium tin oxide
Second transparent electrode layer: Indium tin oxide
First transparent substrate: Polyethylene terephthalate film
Second transparent substrate: Polyethylene terephthalate film
Polymerization initiator: α-hydroxyacetophenone
Liquid crystal compound: Terphenyl compound
Spacer: Spherical shape (made of PMMA)
UV-polymerizable compound: Acrylate monomer

Test Example 1

A liquid crystal compound, a UV-polymerizable compound, a polymerization initiator and spacers with a diameter of 20 μm were mixed together to prepare a coating liquid. The amount of the liquid crystal compound and the amount of the UV-polymerizable compound were set so that the volume occupancy of the liquid crystal composition was 30% in the light control layer after phase separation. Then, a 20 μm thick coating layer was formed on the first transparent electrode layer, and the coating layer was laminated with the first transparent electrode layer and the second transparent electrode layer. Then, the coating layer was irradiated with UV light having a wavelength of 360 nm via the first transparent substrate to thereby obtain a light control sheet including the 20 μm thick light control layer.

In Test Example 1, a light control sheet with a void diameter of 0.5 μm, a light control sheet with a void diameter of 1.0 μm, a light control sheet with a void diameter of 2.0

μm, a light control sheet with a void diameter of 2.5 μm and a light control sheet with a void diameter of 3.0 μm were prepared. When preparing the light control sheet with a void diameter of 0.5 μm, the intensity of the UV light was set to 35 mW/cm$^2$ and the UV irradiation time was set to 24 seconds. When preparing the light control sheet with a void diameter of 1.0 μm, the intensity of the UV light was set to 15 mW/cm$^2$ and the UV irradiation time was set to 50 seconds. When preparing the light control sheet with a void diameter of 1.5 μm, the intensity of the UV light was set to 8 mW/cm$^2$ and the UV irradiation time was set to 105 seconds. When preparing the light control sheet with a void diameter of 2.0 μm, the intensity of the UV light was set to 4 mW/cm$^2$ and the UV irradiation time was set to 210 seconds. When preparing the light control sheet with a void diameter of 2.5 μm, the intensity of the UV light was set to 1.5 mW/cm$^2$ and the UV irradiation time was set to 540 seconds. When preparing the light control sheet with a void diameter of 3.0 μm, the intensity of the UV light was set to 0.7 mW/cm$^2$ and the UV irradiation time was set to 1,200 seconds.

As a result of calculating the volume occupancy of the liquid crystal composition in the light control layer included in each light control sheet by the method described below, the volume occupancy of the liquid crystal composition in each light control sheet was found to be 30%.

Test Example 2

Light control sheets of Test Example 2 were obtained in the same manner as in Test Example 1 except that the liquid crystal compound and the UV-polymerizable compound in Test Example 1 were used in amounts such that the volume occupancy of the liquid crystal composition was 40% in the light control layer after phase separation. As a result of calculating the volume occupancy of the liquid crystal composition in the light control layer included in each light control sheet by the method described below, the volume occupancy of the liquid crystal composition in each light control sheet was found to be 40%.

Test Example 3

Light control sheets of Test Example 3 were obtained in the same manner as in Test Example 1 except that the liquid crystal compound and the UV-polymerizable compound in Test Example 1 were used in amounts such that the volume occupancy of the liquid crystal composition was 50% in the light control layer after phase separation. As a result of calculating the volume occupancy of the liquid crystal composition in the light control layer included in each light control sheet by the method described below, the volume occupancy of the liquid crystal composition in each light control sheet was found to be 50%.

Test Example 4

Light control sheets of Test Example 4 were obtained in the same manner as in Test Example 1 except that the liquid crystal compound and the UV-polymerizable compound in Test Example 1 were used in amounts such that the volume occupancy of the liquid crystal composition was 60% in the light control layer after phase separation. As a result of calculating the volume occupancy of the liquid crystal composition in the light control layer included in each light control sheet by the method described below, the volume occupancy of the liquid crystal composition in each light control sheet was found to be 60%.

Test Example 5

Light control sheets of Test Example 5 were obtained in the same manner as in Test Example 1 except that the liquid crystal compound and the UV-polymerizable compound in Test Example 1 were used in amounts such that the volume occupancy of the liquid crystal composition was 70% in the light control layer after phase separation. As a result of calculating the volume occupancy of the liquid crystal composition in the light control layer included in each light control sheet by the method described below, the volume occupancy of the liquid crystal composition in each light control sheet was found to be 70%.

Test Example 6

Light control sheets of Test Example 6 were obtained in the same manner as in Test Example 1 except that the liquid crystal compound and the UV-polymerizable compound in Test Example 1 were used in amounts such that the volume occupancy of the liquid crystal composition was 80% in the light control layer after phase separation. As a result of calculating the volume occupancy of the liquid crystal composition in the light control layer included in each light control sheet by the method described below, the volume occupancy of the liquid crystal composition in each light control sheet was found to be 80%.

Evaluation Method

Void Diameter

For the 5 types of light control sheets included in each test example, a cross-section perpendicular to the plane in which the light control sheet extends, that is, a cross-section parallel to the thickness direction of the light control sheet, was exposed. Before exposing the cross-section of the light control layer, the entire light control sheet was embedded in a resin. Then, after the liquid crystal composition contained in the light control layer was removed, the cross-section was observed with a scanning electron microscope to measure the void diameters of all the voids contained in a single field of view. For each light control sheet, the void diameters of approximately 7 voids were measured. Then, the void diameters were averaged for each light control sheet, and the average value was set as the void diameter.

Volume Occupancy of Liquid Crystal Composition

A cross-section of the light control sheet parallel to the thickness direction was exposed in the same manner as in measuring the void diameter. In the cross-section of the light control sheet, a region containing no spacers and defined by a unit width in the direction perpendicular to the thickness direction of the light control sheet and a total thickness of the light control layer was set as a volume occupancy calculating region. The unit width was set to 1 mm. Then, the number of voids contained in the calculating region was counted, and then the area of voids calculated using the average diameter of the voids was multiplied by the number of voids to calculate the area occupied by the voids in the calculating region, that is, the area occupied by the liquid crystal composition. Then, the percentage of the area occupied by the liquid crystal composition relative to the area of the calculating region was calculated as the volume occupancy of the liquid crystal composition.

Clarity Value

For the 5 types of light control sheets included in each test example, a clarity value in the opaque state, that is, when a voltage applied between the transparent electrode layers was 0 V, was measured using a haze/transparency meter (haze-gard i, manufactured by BYK-Gardner). The clarity value was calculated using the above formula (1).

Evaluation Results

Figure 3:
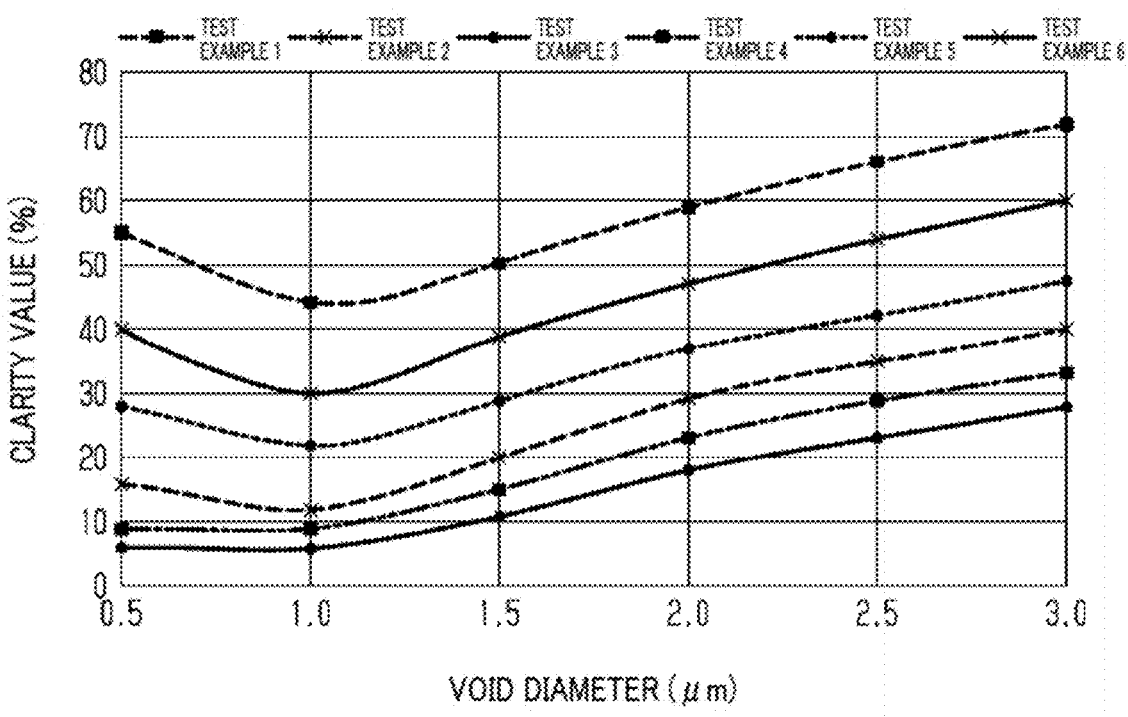
FIG. 3 is a graph showing the relationship between the clarity value and the void diameter in Test Examples 1 to 6.

With reference to FIG. 3, the evaluation results will be described.

As shown in FIG. 3, when comparing the clarity values among the light control sheets having the same void diameter, the clarity value in the opaque state was found to be lowest when the volume occupancy of the liquid crystal composition in the light control layer was 50%. Further, when comparing the clarity values among the light control sheets having the same void diameter, the clarity values in both cases where the volume occupancy of the liquid crystal composition in the light control layer was greater than 50% and smaller than 50% were found to be greater than the clarity value when the volume occupancy of the liquid crystal composition was 50%.

When the volume occupancy of the liquid crystal composition in the light control layer was smaller than 50%, it was found that the smaller the volume occupancy of the liquid crystal composition, the greater the clarity value. On the other hand, when the volume occupancy of the liquid crystal composition in the light control layer was greater than 50%, it was found that the greater the volume occupancy of the liquid crystal composition, the greater the clarity value.

When comparing the clarity values among the light control sheets having the same volume occupancy of the liquid crystal composition, the clarity value was found to be minimum when the void diameter was 1.0 µm, regardless of the volume occupancy of the liquid crystal composition in the light control layer.

Further, the clarity value in the opaque state was found to be 30% or less when the volume occupancy of the liquid crystal composition in the light control layer was within the range of 40% or greater and 60% or less and the void diameter was within the range of 2.0 µm or less.

These results show that when the volume occupancy of the liquid crystal composition in the light control layer is within the range of smaller than 50%, the volume occupancy of the polymer resin layer in the light control layer relatively increases, suppressing scattering in the light control layer, resulting in an increase in the clarity value. On the other hand, when the volume occupancy of the liquid crystal composition in the light control layer is within the range of greater than 50%, the volume occupancy of the liquid crystal composition in the light control layer relatively increases, suppressing scattering in the light control layer, resulting in an increase in the clarity value.

Thickness of Light Control Layer and Haze Value

Test Example 7

Light control sheets of Test Example 7 were obtained in the same manner as in Test Example 3 except that the void diameter in Test Example 3 was fixed to 1.5 µm and the thickness of the light control layer was changed to five different thicknesses. In Test Example 7, the intensity of the UV light was set to 8 mW/cm² and the UV irradiation time was set to 105 seconds. In Test Example 7, a light control sheet having a 16 µm thick light control layer, a light control sheet having a 18 µm thick light control layer, a light control sheet having a 20 µm thick light control layer, a light control sheet having a 25 μm thick light control layer and a light control sheet having a 30 μm thick light control layer were prepared.

When forming a 16 μm thick light control layer, spacers with a diameter of 16 μm were used, and when forming a 18 μm thick light control layer, spacers with a diameter of 18 μm were used. Further, when forming a 25 μm thick light control layer, spacers with a diameter of 25 μm were used, and when forming a 30 μm thick light control layer, spacers with a diameter of 30 μm were used. In addition, as a result of calculating the volume occupancy of the liquid crystal composition in the light control layer included in each light control sheet, the volume occupancy of the liquid crystal composition in each light control sheet was found to be 50%.

Test Example 8

Light control sheets of Test Example 8 were obtained in the same manner as in Test Example 7 except that the void diameter in Test Example 7 was fixed to 2.0 μm by setting the intensity of the UV light to 4 mW/cm² and setting the UV irradiation time to 210 seconds. As a result of calculating the volume occupancy of the liquid crystal composition in the light control layer included in each light control sheet, the volume occupancy of the liquid crystal composition in each light control sheet was found to be 50%.

Test Example 9

Light control sheets of Test Example 9 were obtained in the same manner as in Test Example 7 except that the void diameter in Test Example 7 was fixed to 3.0 μm by setting the intensity of the UV light to 0.7 mW/cm² and setting the UV irradiation time to 1,200 seconds. As a result of calculating the volume occupancy of the liquid crystal composition in the light control layer included in each light control sheet, the volume occupancy of the liquid crystal composition in each light control sheet was found to be 50%.

Evaluation Method

Void Diameter

For the 5 types of light control sheets included in each test example, a void diameter was measured in the same manner as in evaluating the light control sheets of Test Examples 1 to 6.

Haze Value

For the 5 types of light control sheets included in each test example, a haze value was measured by the method according to JIS K 7136:2000 "Plastics—Determination of Haze for Transparent Materials" using a haze meter (NDH 7000SP, manufactured by Nippon Denshoku Industries Co., Ltd.). For each light control sheet, a haze value in the opaque state, that is, when a voltage applied between the transparent electrode layers was 0 V, and a haze value in the transparent state, that is, when a voltage applied between the transparent electrode layers was 60V, were measured.

Evaluation Results

Figure 4:
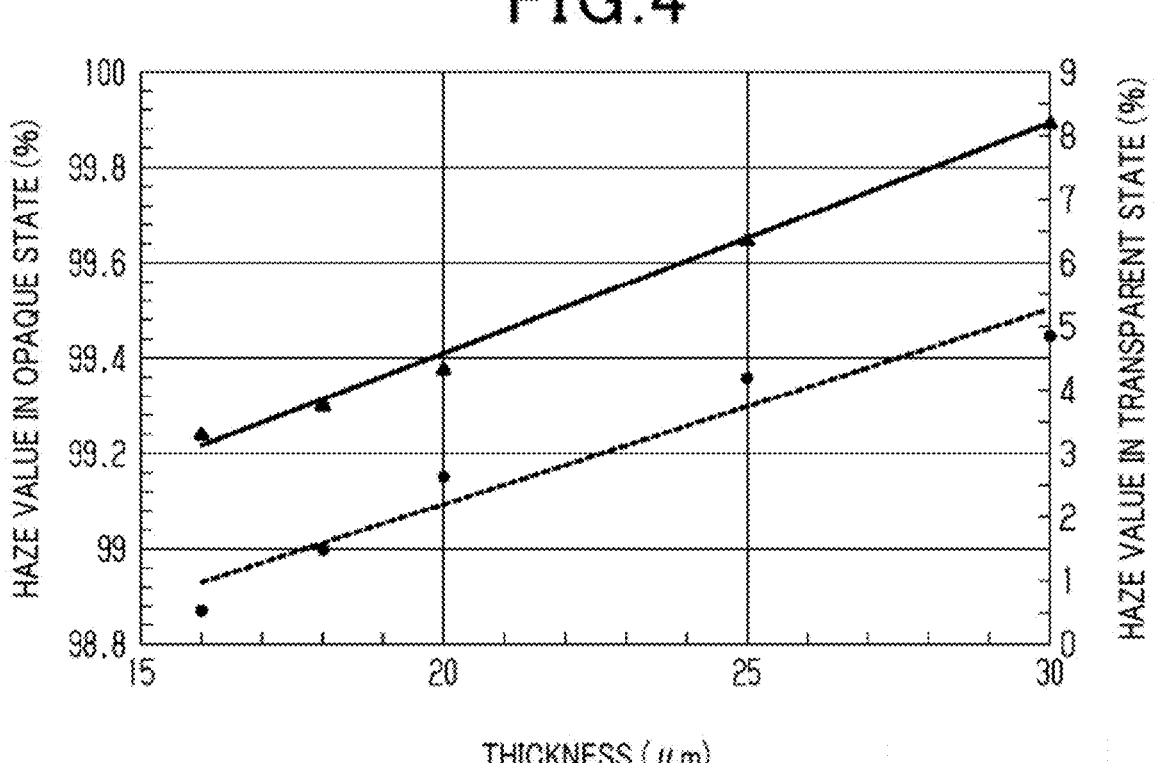
FIG. 4 is a graph showing haze values in the opaque state and transparent state in Test Example 7.
Figures 5, 6:
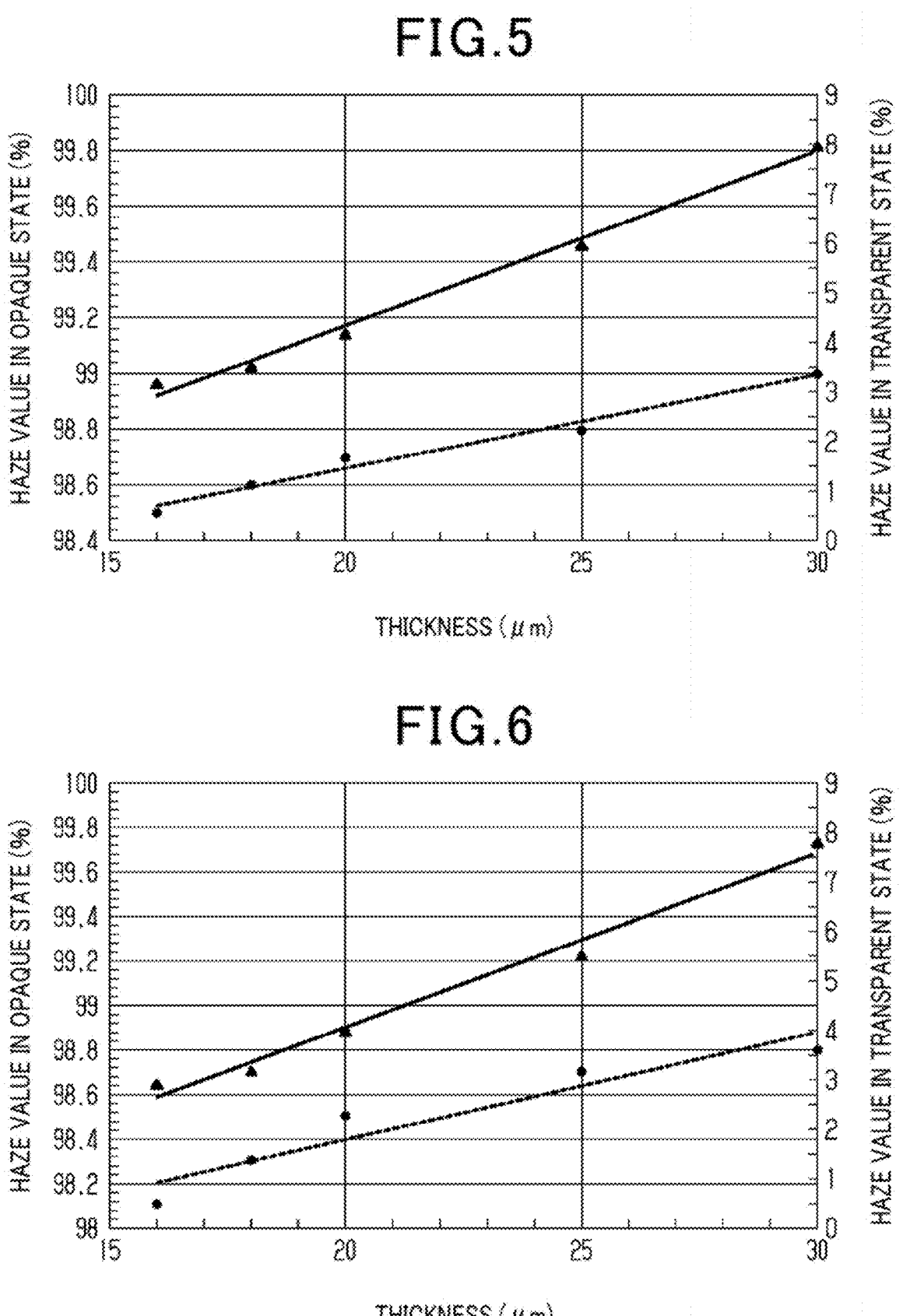
FIG. 5 is a graph showing haze values in the opaque state and transparent state in Test Example 8.
FIG. 6 is a graph showing haze values in the opaque state and transparent state in Test Example 9.

With reference to FIGS. 4 to 7, the evaluation results will be described. FIG. 4 shows the haze values in Test Example 7. FIG. 5 shows the haze values in Test Example 8. FIG. 6 shows the haze values in Test Example 9. In FIGS. 4 to 6, the haze values when the light control sheet is in the opaque state are indicated by black circles, and the haze values when the light control sheet is in the transparent state are indicated by black triangles.

As shown in FIG. 4, in Test Example 7, the haze value in the opaque state of the light control sheet was found to be 98.9% when the light control layer had a thickness of 16 μm, 99.0% when the light control layer had a thickness of 18 μm, and 99.2% when the light control layer had a thickness of 20 μm. Further, the haze value in the opaque state of the light control sheet was found to be 99.4% when the light control layer had a thickness of 25 μm, and 99.5% when the light control layer had a thickness of 30 μm. The haze value when the light control sheet was in the opaque state was found to be 98% or greater regardless of the thickness of the light control layer. The approximate formula obtained from the 5 haze values was as follows.

$$y = 0.0414x + 98.265$$

The haze value in the transparent state of the light control sheet was found to be 3.3% when the light control layer had a thickness of 16 μm, 3.8% when the light control layer had a thickness of 18 μm, and 4.4% when the light control layer had a thickness of 20 μm. Further, the haze value in the transparent state of the light control sheet was found to be 6.4% when the light control layer had a thickness of 25 μm, and 8.2% when the light control layer had a thickness of 30 μm. The approximate formula obtained from the 5 haze values was as follows.

$$y = 0.3603x - 2.6301$$

From the approximate formula, the thickness of the light control layer in which the haze value in the transparent state of the light control sheet was 5% or less was found to be 21.18 μm or less.

As shown in FIG. 5, in Test Example 8, the haze value in the opaque state of the light control sheet was found to be 98.5% when the light control layer had a thickness of 16 μm, 98.6% when the light control layer had a thickness of 18 μm, and 98.7% when the light control layer had a thickness of 20 μm. Further, the haze value in the opaque state of the light control sheet was found to be 98.8% when the light control layer had a thickness of 25 μm, and 99.0% when the light control layer had a thickness of 30 μm. The haze value when the light control sheet was in the opaque state was found to be 98% or greater regardless of the thickness of the light control layer. The approximate formula obtained from the 5 haze values was as follows.

$$y = 0.0335x + 97.989$$

The haze value in the transparent state of the light control sheet was found to be 3.2% when the light control layer had a thickness of 16 μm, 3.5% when the light control layer had a thickness of 18 μm, and 4.2% when the light control layer had a thickness of 20 μm. Further, the haze value in the transparent state of the light control sheet was found to be 6.0% when the light control layer had a thickness of 25 μm, and 8.0% when the light control layer had a thickness of 30 μm. The approximate formula obtained from the 5 haze values was as follows.

$$y = 0.3523x - 2.7008$$

From the approximate formula, the thickness of the light control layer in which the haze value in the transparent state of the light control sheet was 5% or less was found to be 21.86 μm or less.

As shown in FIG. 6, in Test Example 9, the haze value in the opaque state of the light control sheet was found to be 98.1% when the light control layer had a thickness of 16 μm, 98.3% when the light control layer had a thickness of 18 μm, and 98.5% when the light control layer had a thickness of 20 μm. The haze value in the opaque state of the light control sheet was found to be 98.7% when the light control layer had a thickness of 25 μm, and 98.8% when the light control layer had a thickness of 30 μm. The haze value when the light control sheet was in the opaque state was found to be 98% or greater regardless of the thickness of the light control layer. The approximate formula obtained from the 5 haze values was as follows.

$$y = 0.048x + 97.434$$

The haze value in the transparent state of the light control sheet was found to be 2.9% when the light control layer had a thickness of 16 μm, 3.2% when the light control layer had a thickness of 18 μm, and 4.0% when the light control layer had a thickness of 20 μm. The haze value in the transparent state of the light control sheet was found to be 5.5% when the light control layer had a thickness of 25 μm, and 7.8% when the light control layer had a thickness of 30 μm. The approximate formula obtained from the 5 haze values was as follows.

$$y = 0.3523x - 3.0008$$

From the approximate formula, the thickness of the light control layer in which the haze value in the transparent state of the light control sheet was 5% or less was found to be 22.71 μm or less.

Figure 7:
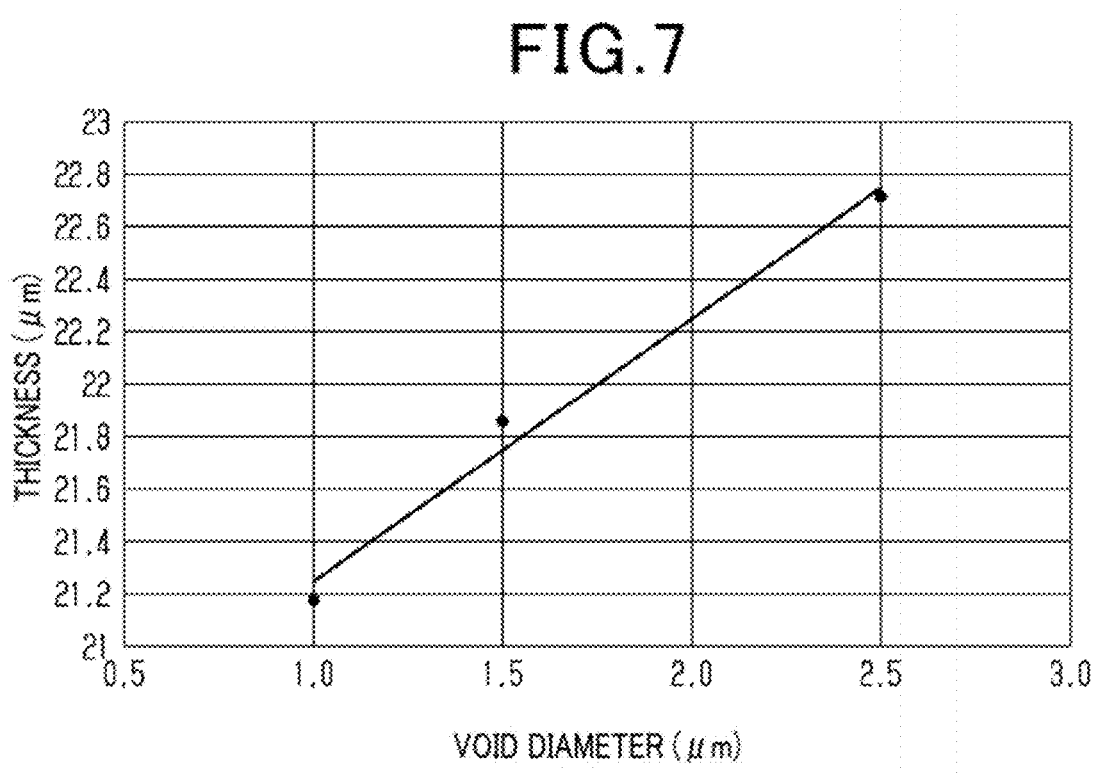
FIG. 7 is a graph showing the relationship between the thickness of the light control layer and the void diameter.

As shown in FIG. 7, the thicknesses of the light control layer obtained from the approximate formulas in Test Examples 7 to 9 were plotted on a two-dimensional plane defined by the void diameter and the thickness of the light control layer. The approximate formula obtained from the plotted 3 values was as follows.

$$y = 0.9957x + 19.759$$

In order to satisfy the haze value being 98% or greater when the light control sheet is in the opaque state and the haze value being 5% or less when the light control sheet is in the transparent state, it is preferred that the thickness DLC μm of the light control layer and the void diameter DD μm satisfy the following formula.

$$\text{Thickness } DLC \leq \text{Void diameter } DD + 20 \ \mu m$$

Thickness of Light Control Layer and Clarity Value

Test Example 10

Light control sheets of Test Example 10 were obtained in the same manner as in Test Example 3 except that the void diameter in Test Example 3 was fixed to 2.0 μm and the thickness of the light control layer was changed to six different thicknesses. In Test Example 10, the intensity of the UV light was set to 4 mW/cm$^2$ and the UV irradiation time was set to 210 seconds. In Test Example 10, a light control sheet having a 14 μm thick light control layer, a light control sheet having a 16 μm thick light control layer, a light control sheet having a 20 μm thick light control layer, a light control sheet having a 25 μm thick light control layer, a light control sheet having a 28 μm thick light control layer and a light control sheet having a 30 μm thick light control layer were prepared.

When forming a 14 μm thick light control layer, spacers with a diameter of 14 μm were used, and when forming a 16 μm thick light control layer, spacers with a diameter of 16 μm were used. Further, when forming a 25 μm thick light control layer, spacers with a diameter of 25 μm were used, and when forming a 28 μm thick light control layer, spacers with a diameter of 28 μm were used. When forming a 30 μm thick light control layer, spacers with a diameter of 30 μm were used.

In addition, as a result of calculating the volume occupancy of the liquid crystal composition in the light control layer included in each light control sheet, the volume occupancy of the liquid crystal composition in each light control sheet was found to be 50%.

Evaluation Method

Clarity Value

For the 6 types of light control sheets included in Test Example 10, a clarity value when the light control sheet was in the opaque state was measured in the same manner as in evaluating the light control sheets of Test Examples 1 to 6. Evaluation Results With reference to FIG. 8, the evaluation results will be described.

Figure 8:
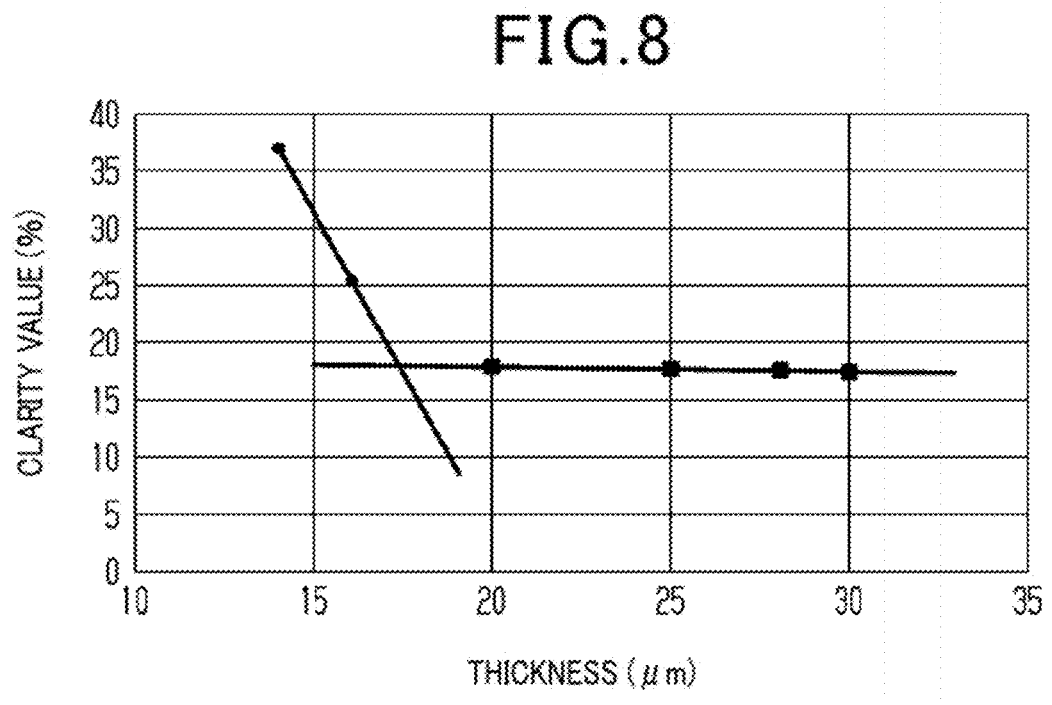
FIG. 8 is a graph showing the relationship between the thickness of the light control layer and the clarity value.

As shown in FIG. 8, in Test Example 10, the clarity value in the opaque state of the light control sheet was found to be 37.0% when the light control layer had a thickness of 14 μm, 25.6% when the light control layer had a thickness of 16 μm, and 17.6% when the light control layer had a thickness of 20 μm. The clarity value in the opaque state of the light control sheet was found to be 18.0% when the light control layer had a thickness of 25 μm, 17.6% when the light control layer had a thickness of 28 μm, and 17.3% when the light control layer had a thickness of 30 μm.

The approximate formula obtained from the clarity value when the light control layer had a thickness of 14 μm and the clarity value when the light control layer had a thickness of 16 μm among the 6 clarity values was as follows.

$$y = -5.7x + 116.8$$

On the other hand, the approximate formula obtained from the clarity value when the light control layer had a thickness of 20 μm, the clarity value when the light control layer had a thickness of 25 μm, the clarity value when the light control layer had a thickness of 28 μm and the clarity value when the light control layer had a thickness of 30 μm was as follows.

$$y = -0.0278x + 18.34$$

From the two approximate formulas, in order to satisfy the clarity value being 20% or less when the light control sheet is in the opaque state, it is preferred that the thickness DLC of the light control layer satisfies the following.

$$17 \ \mu m \leq Thickness DLC$$

Comparison of Optical Properties in Various Structures

In Test Examples 12 to 20 below, the following dichroic dye was used.

Dichroic dye: Azo compound

Test Example 11

A light control sheet of Test Example 11 was obtained in the same manner as in Test Example 3 except that the void diameter in Test Example 3 was set to 2.0 μm. As a result of calculating the volume occupancy for the light control layer included in the light control sheet, the volume occupancy of the liquid crystal composition was found to be 50%.

Test Example 12

A light control sheet of Test Example 12 was obtained in the same manner as in Test Example 11 except that the liquid crystal compound and the UV-polymerizable compound in Test Example 11 were used in amounts such that the volume occupancy of the liquid crystal composition was 50% in the light control layer after phase separation, and a dichroic dye was added to the coating liquid. In Test Example 12, when the total amount of the coating liquid containing the dichroic dye was 100 mass %, the concentration of the dichroic dye was set to 2 mass %. As a result of calculating the volume occupancy for the light control layer included in the light control sheet, the volume occupancy of the liquid crystal composition was found to be 50%.

Test Example 13

The light control sheet of Test Example 11 and the light control sheet of Test Example 12 were prepared. Then, the light control sheet of Test Example 12 was bonded to the light control sheet of Test Example 11 using a 30 μm thick adhesive layer formed using an optical clear adhesive. Thus, a light control sheet of Test Example 13 was obtained. As a result of calculating the volume occupancy for the light control layer included in each light control sheet, the volume occupancy of the liquid crystal composition in each light control sheet was found to be 50%.

Test Example 14

A light control sheet of Test Example 14 was obtained in the same manner as in Test Example 13 except that two light control sheets of Test Example 12 were prepared in Test Example 13. As a result of calculating the volume occupancy for the light control layer included in each light control sheet, the volume occupancy of the liquid crystal composition in each light control sheet was found to be 50%.

Test Example 15

A light control sheet of Test Example 15 was obtained in the same manner as in Test Example 12 except that the liquid crystal compound and the UV-polymerizable compound in Test Example 12 were used in amounts such that the volume occupancy of the liquid crystal composition was 50% in the light control layer after phase separation, and the concentration of the dichroic dye was changed to 1 mass %. As a result of calculating the volume occupancy for the light control layer included in the light control sheet, the volume occupancy of the liquid crystal composition in the light control sheet was found to be 50%.

Test Example 16

A light control sheet of Test Example 16 was obtained in the same manner as in Test Example 13 except that the light control sheet of Test Example 15, instead of the light control sheet of Test Example 12, was prepared in Test Example 13. As a result of calculating the volume occupancy for the light control layer included in each light control sheet, the volume occupancy of the liquid crystal composition in each light control sheet was found to be 50%.

Test Example 17

A light control sheet of Test Example 17 was obtained in the same manner as in Test Example 16 except that two light control sheets of Test Example 15 were prepared in Test Example 16. As a result of calculating the volume occupancy for the light control layer included in each light control sheet, the volume occupancy of the liquid crystal composition in each light control sheet was found to be 50%.

Test Example 18

A light control sheet of Test Example 18 was obtained in the same manner as in Test Example 12 except that the liquid crystal compound and the UV-polymerizable compound in Test Example 12 were used in amounts such that the volume occupancy of the liquid crystal composition was 50% in the light control layer after phase separation, and the concentration of the dichroic dye was changed to 0.5 mass %. As a result of calculating the volume occupancy for the light control layer included in the light control sheet, the volume occupancy of the liquid crystal composition in the light control sheet was found to be 50%.

Test Example 19

A light control sheet of Test Example 19 was obtained in the same manner as in Test Example 13 except that the light control sheet of Test Example 18, instead of the light control sheet of Test Example 12, was prepared in Test Example 13. As a result of calculating the volume occupancy for the light control layer included in each light control sheet, the volume occupancy of the liquid crystal composition in each light control sheet was found to be 50%.

Test Example 20

A light control sheet of Test Example 20 was obtained in the same manner as in Test Example 19 except that two light control sheets of Test Example 18 were prepared in Test Example 19. As a result of calculating the volume occupancy for the light control layer included in each light control sheet, the volume occupancy of the liquid crystal composition in each light control sheet was found to be 50%.

Evaluation Method

In all the evaluation methods for the optical properties described below of the light control sheet including two light control layers, the magnitude of the voltage applied to the two light control layers when the light control sheet is in the opaque state and in the transparent state was set to be equal.

Haze Value

For the light control sheet of each test example, a haze value was measured in the same manner as in evaluating the light control sheets of Test Examples 7 to 9.

Total Light Transmittance (%)

For the light control sheet of each test example, a total light transmittance was measured by the method according to JIS K 7136:2000 "Plastics—Determination of Haze for Transparent Materials" using a haze meter (NDH 7000SP, manufactured by Nippon Denshoku Industries Co., Ltd.). For each light control sheet, a total light transmittance in the opaque state, that is, when a voltage applied between the transparent electrode layers was 0 V, and a total light transmittance in the transparent state, that is, when a voltage applied between the transparent electrode layers was 60V, were measured.

Parallel Light Transmittance

For the light control sheet of each test example, a parallel light transmittance was measured by the method according to JIS K 7136:2000 "Plastics—Determination of Haze for Transparent Materials" using a haze meter (NDH 7000SP, manufactured by Nippon Denshoku Industries Co., Ltd.). For each light control sheet, a parallel light transmittance in the opaque state, that is, when a voltage applied between the transparent electrode layers was 0 V, and a parallel light transmittance in the transparent state, that is, when a voltage applied between the transparent electrode layers was 60V, were measured.

Clarity Value

For the light control sheet of each test example, a clarity value was measured in the same manner as in evaluating the light control sheets of Test Examples 1 to 6.

Evaluation Results

With reference to FIGS. 1 to 3, the evaluation results will be described.

Table 1 shows the results of evaluating the optical properties of the light control sheets of Test Examples 11 to 14.

TABLE 1

| | Concentration of dichroic dye: 2 mass % | | | | | | | |
| | 0 V | | | | 60 V | | | |
| Optical properties | Test Ex. 14 | Test Ex. 13 | Test Ex. 12 | Test Ex. 11 | Test Ex. 14 | Test Ex. 13 | Test Ex. 12 | Test Ex. 11 |
|---|---|---|---|---|---|---|---|---|
| Haze (%) | 99.8 | 99.7 | 98.1 | 99.2 | 9.0 | 8.4 | 5.3 | 4.4 |
| Total light transmittance (%) | 5.1 | 14.6 | 23.4 | 74.0 | 46.0 | 61.6 | 65.4 | 87.7 |
| Parallel light transmittance (%) | 0 | 0 | 0.4 | 0.6 | 41.8 | 56.4 | 61.9 | 83.9 |
| Clarity (%) | 0 | 0 | 41.4 | 17.6 | * | * | * | * |

As shown in Table 1, in all the light control sheets of Test Examples 11 to 14, the haze value when the light control sheet was in the opaque state was found to be 98% or greater. Further, in the light control sheet of Test Example 11, the clarity value when the light control sheet was in the opaque state was found to be 20% or less. Furthermore, in the light control sheets of Test Examples 13 and 14, the clarity value when the light control sheet was in the opaque state was found to be 0%. On the other hand, in the light control sheet of Test Example 11, the haze value when the light control sheet was in the transparent state was found to be 5% or less.

Table 2 shows the results of evaluating the optical properties of the light control sheets of Test Examples 15 to 17.

TABLE 2

| | Concentration of dichroic dye: 1 mass % | | | | | |
| | 0 V | | | 60 V | | |
| Optical properties | Test Ex. 17 | Test Ex. 16 | Test Ex. 15 | Test Ex. 17 | Test Ex. 16 | Test Ex. 15 |
|---|---|---|---|---|---|---|
| Haze (%) | 99.7 | 99.7 | 98.5 | 11.7 | 10.5 | 7.0 |
| Total light transmittance (%) | 15.1 | 25.9 | 39.6 | 60.1 | 70.1 | 74.7 |
| Parallel light transmittance (%) | 0.1 | 0.1 | 0.6 | 53.1 | 62.8 | 69.5 |
| Clarity (%) | 0 | 0 | 37.8 | * | * | * |

As shown in Table 2, in all the light control sheets of Test Examples 15 to 17, the haze value when the light control sheet was in the opaque state was found to be 98% or greater. Further, in the light control sheets of Test Examples 16 and 17, the clarity when the light control sheet was in the opaque state was found to be 0%.

Table 3 shows the results of evaluating the optical properties of the light control sheets of Test Examples 18 to 20.

TABLE 3

| | Concentration of dichroic dye: 0.5 mass % | | | | | |
| | 0 V | | | 60 V | | |
| Optical properties | Test Ex. 20 | Test Ex. 19 | Test Ex. 18 | Test Ex. 20 | Test Ex. 19 | Test Ex. 18 |
|---|---|---|---|---|---|---|
| Haze (%) | 99.6 | 99.7 | 98.7 | 13.1 | 12.3 | 7.9 |
| Total light transmittance (%) | 27.0 | 37.4 | 52.6 | 69.5 | 75.1 | 80.0 |
| Parallel light transmittance (%) | 0.1 | 0.1 | 0.7 | 60.3 | 65.9 | 73.7 |
| Clarity (%) | 0 | 0 | 36.3 | * | * | * |

As shown in Table 3, in all the light control sheets of Test Examples 18 to 20, the haze value when the light control sheet was in the opaque state was found to be 98% or greater.

Further, in the light control sheets of Test Examples 19 and 20, the clarity when the light control sheet was in the opaque state was found to be 0%.

In production of the light control sheet of Test Example 3, when the mass of the coating liquid composed of the liquid crystal compound, the UV-polymerizable compound, the polymerization initiator and the spacers was 100 mass %, the compounding ratio of each material was set as follows.

| | |
|---|---|
| (a) Liquid crystal compound | 50 mass % |
| (b) UV-polymerizable compound | 48.1 mass % |
| (c) Polymerization initiator | 0.9 mass % |
| (d) Spacer | 1.0 mass % |

Since the compounding ratio of the liquid crystal compound as the liquid crystal composition in the coating liquid was proportional to the volume occupancy of the liquid crystal composition in the light control layer, the compounding ratio of the liquid crystal compound was increased or decreased depending on the volume occupancy of the liquid crystal composition in the light control layer in test examples other than Test Example 3. Further, the coating liquid of test examples other than Test Example 3 was prepared by decreasing the compounding ratio of the UV-polymerizable compound by the amount of increase in the compounding ratio of the liquid crystal compound, or by increasing the compounding ratio of the UV-polymerizable compound by the amount of decrease in the compounding ratio of the liquid crystal compound.

In Test Examples 12 to 20, the compounding ratio of the liquid crystal compound was decreased by the compounding ratio of the dichroic dye. That is, in Test Examples 12 to 14, the compounding ratio of the liquid crystal compound was set to 48 mass %, and the compounding ratio of the dichroic dye was set to 2 mass %. In Test Examples 15 to 17, the compounding ratio of the liquid crystal compound was set to 49 mass %, and the compounding ratio of the dichroic dye was set to 1 mass %. In Test Examples 18 to 20, the compounding ratio of the liquid crystal compound was set to 49.5 mass %, and the compounding ratio of the dichroic dye was set to 0.5 mass %.

As described above, according to one embodiment of the light control sheet and the method of producing a light control sheet, the following effects can be obtained.

(1) The voids with a void diameter of 2 μm or less and filled with the liquid crystal composition are dispersed in the polymer resin layer at a density, in other words, in an amount, such that the volume occupancy of the liquid crystal composition is 40% or greater and 60% or less. This facilitates occurrence of scattering at the interface between the polymer resin layer and the liquid crystal composition, suppressing transmission of parallel light through the light control layer 21, and as a result, the sense of translucency when the light control sheet 11 is in the opaque state is reduced.

(2) The haze value when the light control sheet 11 is in the opaque state can be increased, and the haze value when the light control sheet 11 is in the transparent state can be decreased.

(3) An increase in the clarity value when the light control sheet 11 is in the opaque state can be suppressed.

(4) When the light control sheet 11 includes two light control layers, light that has entered the light control sheet 11 is more scattered in the light control sheet 11 when the light control sheet 11 is in the opaque state, compared to the case where the light control sheet 11 includes a single light control layer 21. Therefore, the sense of translucency when the light control sheet 11 is in the opaque state can be further reduced.

The embodiment described above can be modified and implemented as follows.

Transparent Substrate

When the light control sheet 11 includes two light control layers, it may have the following structure.

That is, the transparent electrode layers may be formed on both sides of the transparent substrate, and each light control layer may be disposed on the respective transparent electrode layers. That is, in the light control sheet 11 described earlier referring to FIG. 2, the adhesive layer 13 and either the first transparent substrate 24 of the first unit 11UN1 or the second transparent substrate 25 of the second unit 11UN2 may be omitted.

Type of Light Control Sheet

The type of the light control sheet 11 may be a reverse type. The reverse type light control sheet further includes a first alignment layer and a second alignment layer in addition to the layers included in the normal type light control sheet 11. The first alignment layer is located between the light control layer 21 and the first transparent electrode layer 22. The second alignment layer is located between the light control layer and the second transparent electrode layer. The light control layer contains a negative type liquid crystal compound having negative dielectric anisotropy instead of a positive type liquid crystal compound having positive dielectric anisotropy.

The first alignment layer and the second alignment layer are vertical alignment layers. The alignment layers align the major axis of the liquid crystal compound to be perpendicular to a surface on a side opposite to that contacting with the first transparent electrode layer 22 and a surface on a side opposite to that contacting with the second transparent electrode layer 23. Further, the alignment layers may align the liquid crystal compound so that the major axis of the liquid crystal compound is tilted by several degrees from the perpendicular within the range that is determined to be substantially perpendicular to the respective surfaces.

Materials for forming the alignment layers may be organic compounds, inorganic compounds or mixtures thereof. Examples of the organic compounds include polyimides, polyamides, polyvinyl alcohols and nitriles. Examples of the inorganic compounds include silicon oxides and zirconium oxides. Further, materials for forming the alignment layers may be silicones. Silicones are compounds having an inorganic portion and an organic portion. The alignment layers may each have a thickness of, for example, 0.02 μm or greater and 0.5 μm or less.

The reverse type light control sheet has a relatively high haze value when the light control sheet is energized, that is, when a potential difference is applied between the first transparent electrode layer 22 and the second transparent electrode layer 23. The reverse type light control sheet has a relatively low haze value when the light control sheet is not energized, that is, when a potential difference is not applied between the first transparent electrode layer 22 and the second transparent electrode layer 23. Accordingly, the reverse type light control sheet becomes opaque when the light control sheet is energized, and becomes transparent when the light control sheet is not energized.

An example light control sheet includes a light control layer and a pair of transparent electrode layers sandwiching the light control layer. The light control sheet includes a pair of transparent substrates that support the transparent electrode layers. The light control layer includes a polymer resin layer and a liquid crystal compound dispersed in the polymer resin layer. The light control sheet becomes opaque when a voltage is not applied to the light control sheet and becomes transparent when a voltage that changes the alignment of the liquid crystal compound is applied to the light control sheet. Applications for the light control sheet are expanding from windows of buildings to windows of aircraft, automobiles, and the like (see e.g., JP 6414312 B).

Passengers of aircraft or automobiles tend to be seated at positions closer to the windows for a longer period of time compared to people staying in buildings. Therefore, since light passing through the windows more easily reaches the passengers, the light control sheet, when in the opaque state, transmits less light entering the light control sheet toward the passengers, that is, reduces the sense of translucency of the light control sheet. Further, in order to protect privacy of passengers from outside the aircraft or automobiles, the light control sheet, when in the opaque state, reduces the sense of translucency of the light control sheet to protect the inside from the outside of the aircraft or automobiles.

A light control sheet for solving the above problems is reversibly changeable between transparent and opaque in response to a change in alignment of a liquid crystal compound. The light control sheet includes a light control layer including a polymer resin layer in which voids are dispersed, and a liquid crystal composition containing the liquid crystal compound, the liquid crystal composition filling the voids. In the light control layer, a percentage of a volume of the liquid crystal composition relative to a total volume of the polymer resin layer and the liquid crystal composition is 40% or greater and 60% or less. Avoid diameter of the voids is 2 μm or less.

A method of producing a light control sheet for solving the above problems is a method of producing a light control sheet that is reversibly changeable between transparent and opaque in response to a change in alignment of a liquid crystal compound. The method of producing a light control sheet includes forming a light control layer including a polymer resin layer in which voids are dispersed by phase separation of a layer containing the liquid crystal compound and a photopolymerizable compound, and a liquid crystal composition containing the liquid crystal compound, the liquid crystal composition filling the voids. The forming a light control layer includes performing the phase separation to cause, in the light control layer, a percentage of a volume of the liquid crystal composition relative to a total volume of the polymer resin layer and the liquid crystal composition to be 40% or greater and 60% or less and a void diameter of the voids to be 2 μm or less.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control sheet, comprising
a light control layer comprising a polymer resin layer and a liquid crystal composition such that the polymer resin layer has voids and the liquid crystal composition is filling the voids,
wherein the light control layer is configured to reversibly change between transparent and opaque in response to a change in alignment of a liquid crystal compound in the liquid crystal composition and formed such that a volume of the liquid crystal composition relative to a total volume of the polymer resin layer and the liquid crystal composition is in a range of 40% to 60% and a void diameter of the voids is 2 μm or less,
wherein the light control sheet satisfies DLC≤DD+20 μm where DLC is a thickness of the light control layer in μm and DD is a void diameter of the voids in μm.

2. The light control sheet according to claim 1, wherein the light control sheet satisfies 17 μm≤DLC.

3. The light control sheet according to claim 2, wherein the light control layer includes a first light control layer and a second light control layer such that the first light control layer is overlapped with the second light control layer.

4. The light control sheet according to claim 1, wherein the light control layer includes a first light control layer and a second light control layer such that the first light control layer is overlapped with the second light control layer.

5. The light control sheet according to claim 1, wherein the light control layer includes a first light control layer and a second light control layer such that the first light control layer is overlapped with the second light control layer.

6. A method of producing a light control sheet according to claim 1, comprising:
forming a light control layer comprising a polymer resin layer and a liquid crystal composition comprising a liquid crystal compound such that the polymer resin layer has voids dispersed by phase separation of a layer comprising the liquid crystal compound and a photopolymerizable compound and that the liquid crystal composition is filling the voids,
wherein the forming the light control layer includes the phase separation that causes a volume of the liquid crystal composition relative to a total volume of the polymer resin layer and the liquid crystal composition to be in a range of 40% to 60% in the light control layer and that a void diameter of the voids to be 2 μm or less in the light control layer.

* * * * *